(12) United States Patent
Nagle et al.

(10) Patent No.: US 7,188,545 B2
(45) Date of Patent: Mar. 13, 2007

(54) SPRING ASSISTED TWO-PIECE MOTION-TRANSMITTING CABLE

(75) Inventors: J. Martin Nagle, Royal Oak, MI (US); Michael J. Konn, Macomb, MI (US)

(73) Assignee: L&P Property Management Company, South Gate, CA (US)

( * ) Notice: Subject to any disclaimer, the term of this patent is extended or adjusted under 35 U.S.C. 154(b) by 146 days.

(21) Appl. No.: 10/400,038

(22) Filed: Mar. 26, 2003

(65) Prior Publication Data

US 2004/0187624 A1 Sep. 30, 2004

(51) Int. Cl.
*F16C 1/22* (2006.01)

(52) U.S. Cl. .................................. 74/502.6; 74/502.4

(58) Field of Classification Search ............. 74/501.5 R–502.6; 439/248; *F16C 1/10, 1/22*
See application file for complete search history.

(56) References Cited

U.S. PATENT DOCUMENTS

| | | | | |
|---|---|---|---|---|
| 3,091,748 A | | 5/1963 | Takes et al. ................. 339/65 |
| 3,094,364 A | | 6/1963 | Lingg .......................... 339/64 |
| 4,294,133 A | * | 10/1981 | Hurley ...................... 74/502.4 |
| 4,580,862 A | | 4/1986 | Johnson ................... 339/64 R |
| 4,789,351 A | | 12/1988 | Fisher, Jr. et al. .......... 439/248 |
| 5,161,428 A | | 11/1992 | Petruccello ................ 74/502.4 |
| 5,261,293 A | * | 11/1993 | Kelley ........................ 74/502.6 |
| 5,295,408 A | * | 3/1994 | Nagle et al. ................ 74/502.6 |
| 5,329,262 A | | 7/1994 | Fisher, Jr. ..................... 333/33 |
| 5,575,180 A | * | 11/1996 | Simon ........................ 74/502.4 |
| 5,577,415 A | * | 11/1996 | Reasoner ................... 74/502.4 |
| 5,653,148 A | | 8/1997 | Reasoner ................... 74/502.4 |
| 5,655,415 A | * | 8/1997 | Nagle et al. ................ 74/502.6 |
| 5,682,797 A | | 11/1997 | Kelley et al. .............. 74/502.4 |
| 5,823,063 A | * | 10/1998 | Nagle et al. ................ 74/502.6 |
| 6,561,057 B2 | * | 5/2003 | Cebollero .................. 74/502.4 |

* cited by examiner

*Primary Examiner*—Vinh T. Luong
(74) *Attorney, Agent, or Firm*—Husch & Eppenberger LLC; Grant D. Kang; Dennis J. M. Donahue, III

(57) ABSTRACT

A two-piece motion-transmitting cable assembly includes first and second cables, each having a core wire surrounded by a conduit; a male housing connected to the first cable and having a ridged length adjustment section; a spring retainer slideably interconnected with the exterior of the male housing and having a female retaining clip at a first end; a female housing connected to the second cable and having a male retaining clip engaging with the female retaining clip when the male and female housings are mated; an adjustment clip engaging with the ridged length adjustment section to lock the male housing in a position relative to the female housing; and a spring contained between the exterior of the male housing and the interior of the spring retainer and interacting with the spring retainer, in conjunction with the retainer clip, to bias the first cable in a direction toward the second cable.

2 Claims, 5 Drawing Sheets

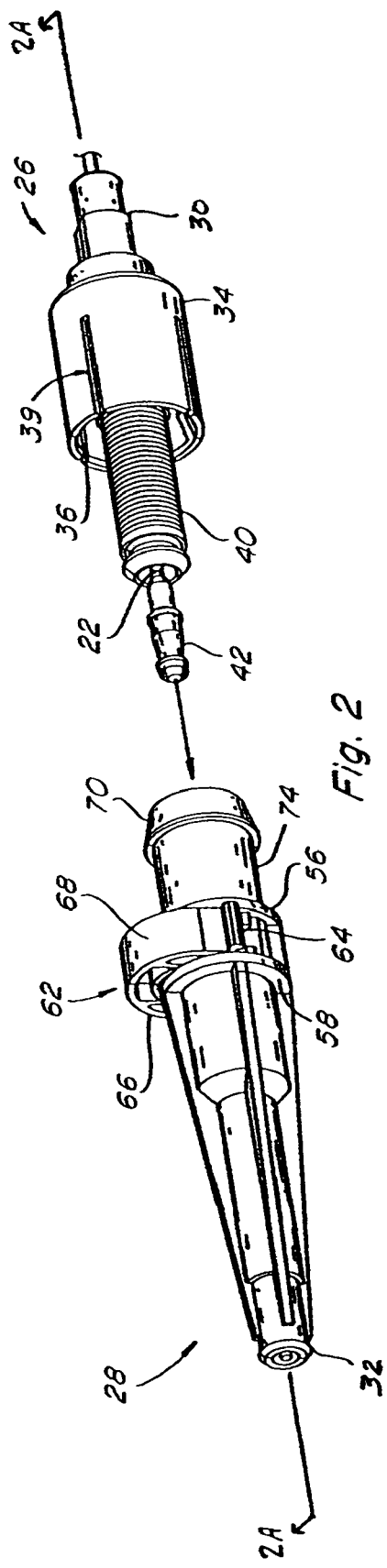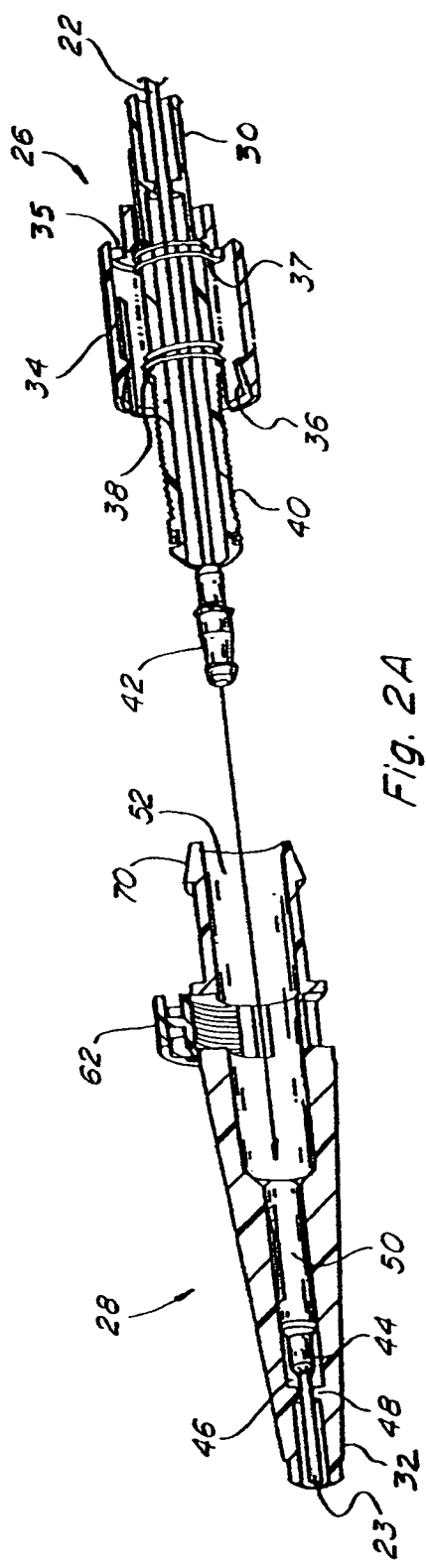

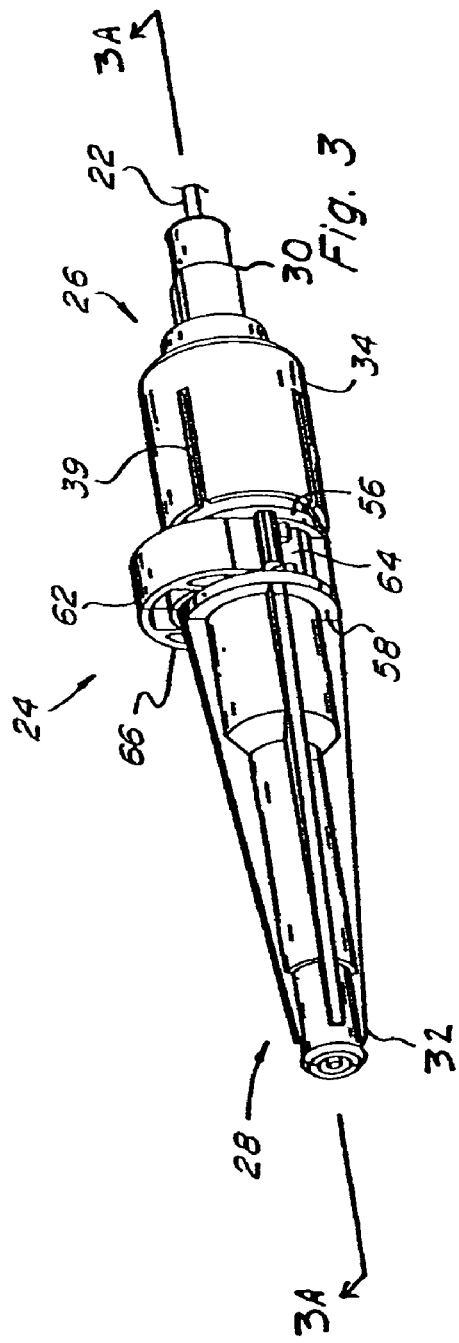
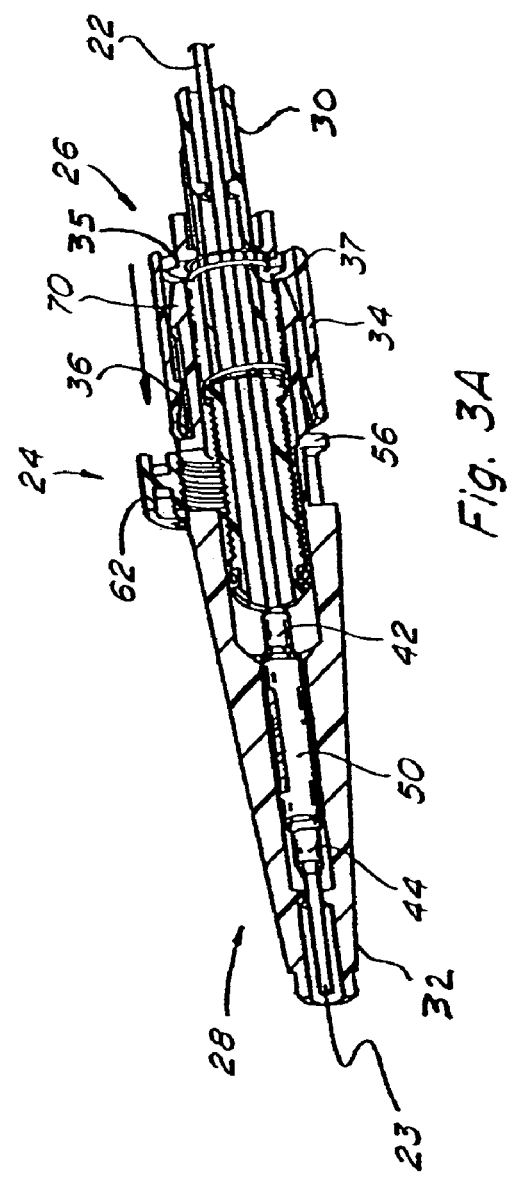

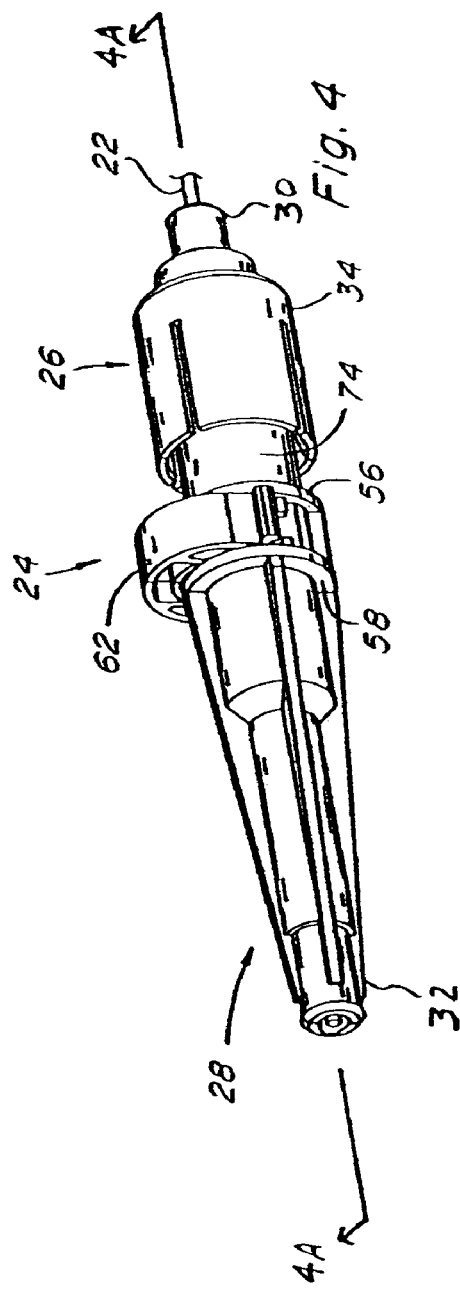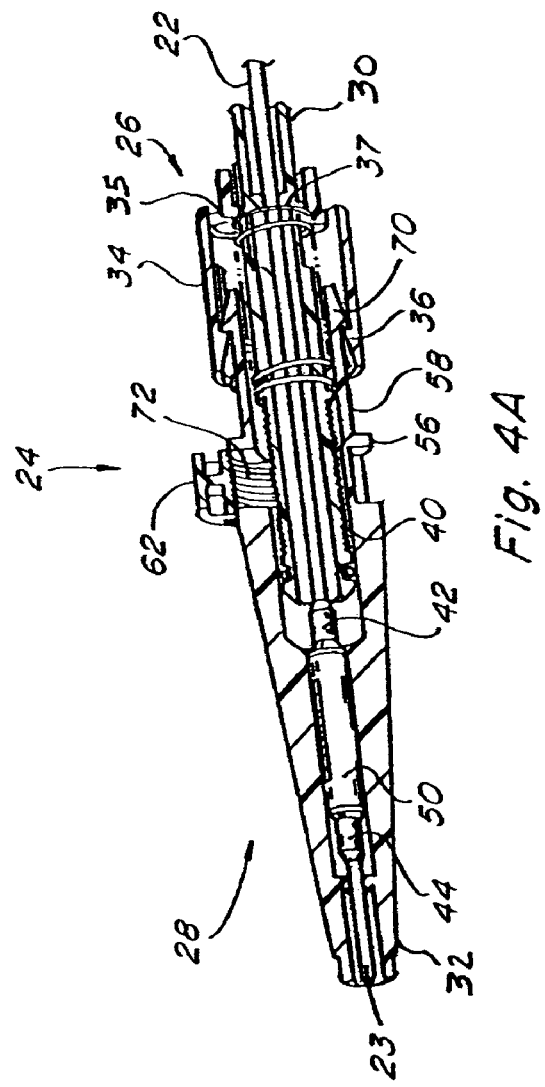
Fig. 4
Fig. 4A

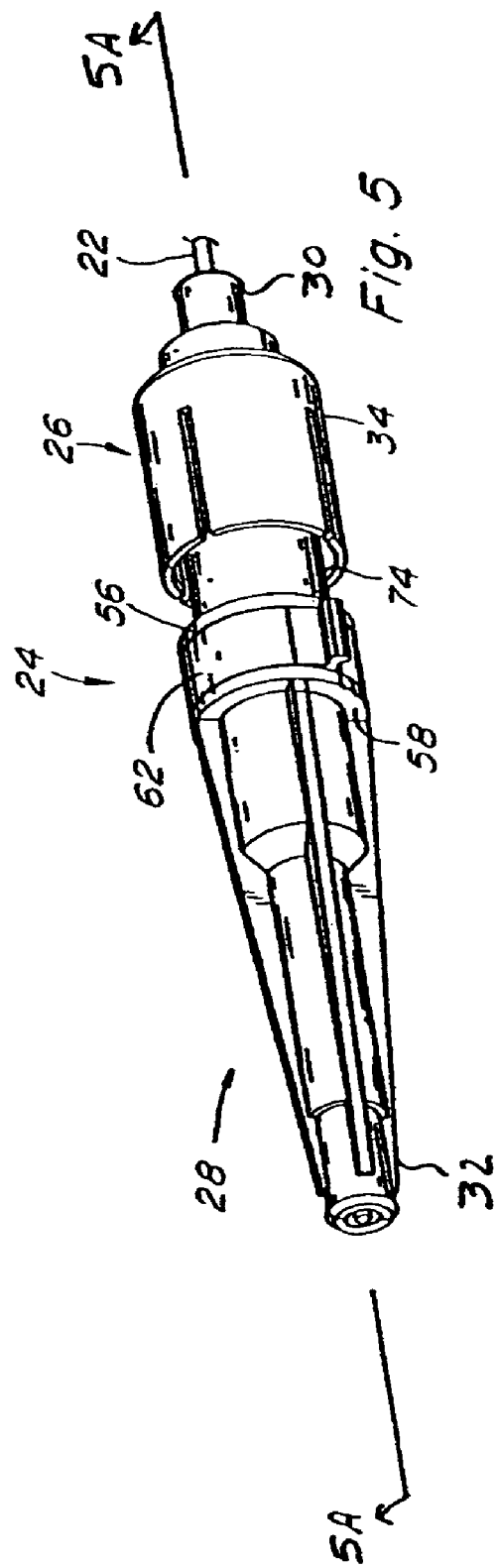
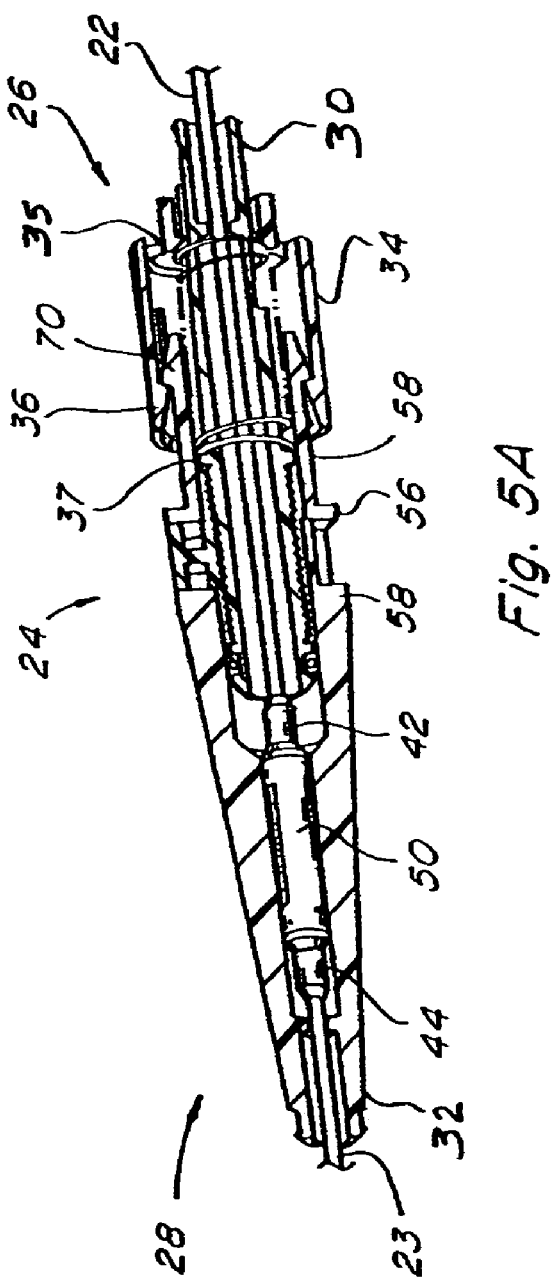
Fig. 5
Fig. 5A

SPRING ASSISTED TWO-PIECE MOTION-TRANSMITTING CABLE

TECHNICAL FIELD OF THE INVENTION

The present invention relates generally to motion-transmitting cable assemblies and, more particularly, to a spring-assisted, two-piece, length-adjustable control cable assembly.

BACKGROUND OF THE INVENTION

Motion-transmitting cables are used in a variety of applications, including, in particular, vehicle transmissions and accelerators. These cables are generally provided with a core wire surrounded by a conduit. The cable functions by allowing movement of the core wire relative to the conduit.

In many applications, such as transmission shift and accelerator controls, achieving a specific length of a motion transmitting cable is critical. Prior art motion-transmitting cable assemblies for these applications include length adjusting mechanisms to compensate for variations in distances between mounting points for the cables. These prior art cable assemblies generally adjust the length of the conduit by providing a conduit separated into two parts surrounding a single core wire. A two-part, telescoping housing is provided wherein each part of the conduit is connected to one part of the telescoping housing. The length of the conduit is adjusted by varying the extent to which the two parts of the housing telescope over one another.

The prior art length adjustable cable assemblies are limited to a single cable assembly including a single core wire, two conduit sections surrounding the core wire and a two-part telescoping housing. An improved length adjustable cable assembly would consist of two entirely separate conduit/core wire assemblies that can be positively joined together and would also allow fine adjustment of the overall length of the joined assemblies. Such an assembly would provide improved flexibility for configuring and installing the cable.

The present invention is directed to addressing the need set forth above.

SUMMARY OF THE INVENTION

An aspect of the present invention is to provide a motion-transmitting cable assembly composed of two entirely separate conduit/core wire sub-assemblies capable of being positively joined while also allowing fine adjustment of the overall length of the joined sub-assemblies.

Another aspect of the present invention is provide a two-piece motion-transmitting cable assembly with means for ensuring positive connection of the core wires from each of the two conduit/cable sub-assemblies.

In accordance with the above aspect of the invention, there is provided a two-piece motion-transmitting cable that includes a first cable having a core wire surrounded by a conduit; a second cable having a core wire surrounded by a conduit; a male housing connected to one end of the conduit of the first cable and having a ridged, length adjustment section; a spring retainer slideably interconnected with the exterior of the male housing and having a female retaining clip at a first end; a female housing connected to one end of the conduit of the second cable and having a male retaining clip, which engages with the female retaining clip when the male and female housings are mated, and an adjustment clip, which engages with the ridged length adjustment section to lock the male housing in a position relative to the female housing; and a spring contained between the exterior of the male housing and the interior of the spring retainer and interacting with the spring retainer to bias the first cable in a direction toward the second cable.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 2 is a perspective view of a connector/adjuster assembly for a two-piece motion-transmitting cable according to another embodiment prior to connection of the two cable sub-assemblies.

FIG. 2A is a partial section view of the connector/adjuster assembly of FIG. 2 taken along line 2A—2A.

FIG. 3 is a perspective view of a connector/adjuster assembly for a two-piece motion-transmitting cable according to another embodiment at initial connection of the two cable sub-assemblies.

FIG. 3A is a partial section view of the connector/adjuster assembly of FIG. 3 taken along line 3A—3A.

FIG. 4 is a perspective view of a connector/adjuster assembly for a two-piece motion-transmitting cable according to another embodiment prior to locking the two cable sub-assemblies together.

FIG. 4A is a partial section view of the connector/adjuster assembly of FIG. 4 taken along line 4A—4A.

FIG. 5 is a perspective view of a connector/adjuster assembly for a two-piece motion-transmitting cable according to another embodiment after locking the two cable sub-assemblies together.

FIG. 5A is a partial section view of the connector/adjuster assembly of FIG. 5 taken along line 5A—5A.

DETAILED DESCRIPTION

Figure 1:
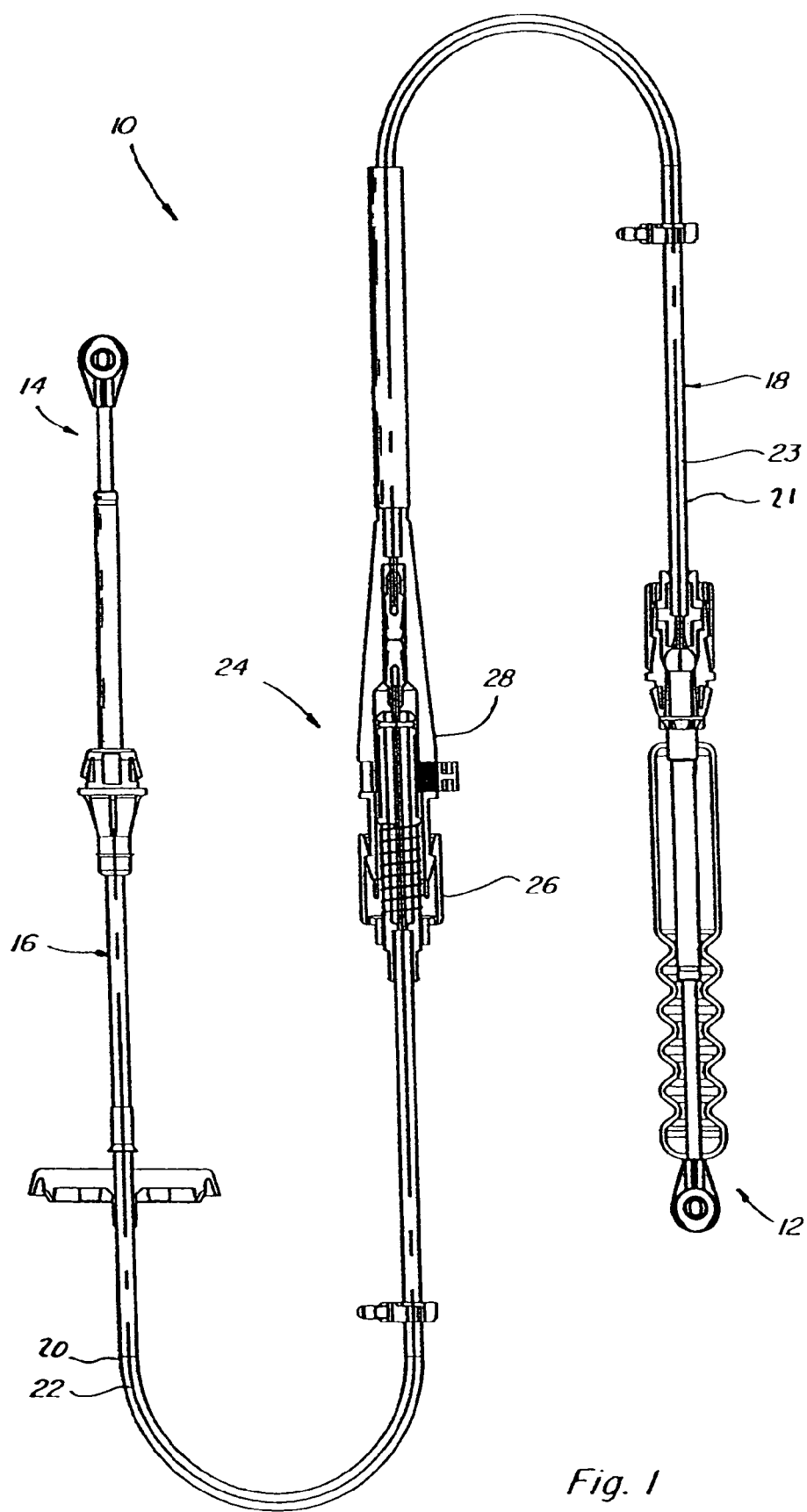
FIG. 1 is a schematic view of a two-piece motion-transmitting cable according to one embodiment of the present invention.

FIG. 1 illustrates a two-piece motion-transmitting cable assembly 10. The particular embodiment shown in FIG. 1 is a transmission shift control cable. The cable 10 has a first or transmission side 12 and a second or shifter side 14. The transmission side 12 and shifter side 14 are separate conduit/core wire sub-assemblies 16, 18 that each include a conduit 20, 21 and a core wire 22, 23. The assembly 10 also includes a connector/adjuster assembly 24. The connector/adjuster assembly 24 includes a male housing 26 connected to the shifter side conduit 20 and a female housing 28 connected to the transmission side conduit 21. It should be clear to those skilled in the art that the positions of the male and female housings relative to the shifter and transmission sides of the cable assembly may be interchanged.

FIGS. 2 and 2A illustrate a connector/adjuster assembly 20 in a state of separation. The transmission side conduit/core wire sub-assembly 16 is connected to a first end 30 of the male housing 26, while the shifter side conduit/core wire sub-assembly 18 is connected to a first end 32 of the female housing 28. A cylindrical spring retainer 34 is slideably interconnected with the exterior of the male housing 26. The spring retainer 34 is open at one end and closed at the other end by a lateral surface 35. A female retaining clip 36, in the form of an inclined surface with a flat face perpendicular to the axis of the housing, is formed at the open end of the spring retainer 34. The spring retainer 34 may also be provided with at least one slotted opening 39, which allows the spring retainer 34 to expand slightly in diameter. A spring 37 is contained between the interior of the spring retainer 34 and the exterior of the male housing 26. The spring 37 is retained at one end by the lateral surface 35 of the spring retainer 34 and at the other by an annular lip 38 extending from the exterior of the male housing 26. On the other side of the annular lip 38, the male housing 26 is provided with a ridged adjustment section 40 composed of a series of ridges encircling the housing. The core wire 22 extends from the end of the male housing 26 and is provided with a fitting 42.

The core wire 23 associated with the female housing 28 is provided with a similar fitting 44. However, the core wire 23 does not extend out of the female housing 28. Instead, the core wire 23 and its fitting 44 are held within a connecting tunnel 46. At one end of the connecting tunnel 46, the core wire is supported by an internal lip 48. A core wire connector 50 is slideably seated within the connecting tunnel 46. During connection of the conduit/core wire sub-assembly 18 with the female housing 28, the core wire fitting 44 is inserted into the core wire connector 50.

The female housing 28 is also provided with a main cavity 52 which communicates with the connecting tunnel 46. On one side of the female housing 28 in the region of the main cavity 52 there is a lateral cut-out 54 in the wall of the female housing 28. On either side of the lateral cut-out 54 are annular extended walls 56, 58. The walls 56, 58 and lateral cut-out 54 define a groove 60 within which an adjustment clip 62 is placed. The adjustment clip 62 includes first and second legs 64, 66 and a body portion 68. The body portion 68 is provided with ridges 72 on the interior arranged to engage with the ridged adjustment section 40 of the male housing 26. The legs 64, 66 extend around the female housing 28 to secure the clip 62 to the female housing 28. The legs 64, 66 and female housing 28 are provided with positioning clips to selectively secure the clip 62 in locked and unlocked positions. In the locked position, the adjustment clip 62 is lowered into the lateral cut-out 54 to engage the ridged adjustment section 40. In the unlocked position, the clip 62 is raised out of the lateral cut-out 54 to disengage its ridges 72 from the adjustment section 40. These positioning clips are well known in the art and, therefore, are not described in more detail. The open end of the female housing 28 is provided with a male retaining clip 70 in the form of an annular inclined surface encircling the exterior of the housing with a flat face perpendicular to the axis of the housing. The male retaining clip 70 is intended to engage with the female retaining clip 36 on the spring retainer 34.

FIGS. 2, 2A, 3, 3A, 4, 4A, 5 and 5A show the progressive steps involved in connecting the transmission 12 and shifter 14 sides of the two-piece cable assembly 10, starting with the two separate pieces and finishing with the two pieces connected and adjusted. As indicated in FIGS. 2 and 2A, the male 26 and female 28 housings are brought toward one another until the male housing 26 is inserted into the main cavity 52 of the female housing 28. FIG. 3A illustrates that the outside diameter of the spring 37 is slightly smaller than the diameter of the main cavity 52. This permits both the male housing 26 and the spring 37 to fit within the main cavity 52, while the spring retainer 34 slides onto the exterior of the female housing 28. As the spring retainer 34 slides onto the female housing 28, the female retaining clip 36 engages with the male retaining clip 70 to secure the male and female housings loosely together. The slotted opening 39 allows the spring retainer 34 to expand slightly in diameter for removal from the female housing 28 if necessary. As FIGS. 3, 3A, 4 and 4A illustrate, there is a flat surface 74 around the exterior of the female housing 28 between the male retaining clip 70 and the first extended wall 56. This flat surface 74 is longer than the female retaining clip 36, thereby allowing a certain amount of linear movement between the spring retainer 34 and the female housing 28 after the male and female retaining clips are engaged. This linear movement allows the spring retainer 34 to be manually advanced toward the first extended wall 56. The advancement of the spring retainer 34, shown in FIG. 3A, compresses the spring 37 via the lateral surface 35. The compressed spring 37 exerts a force on the annular lip 38 of the male housing 26 and advances the male housing 26 forward, which, in turn, advances the core wire 22 forward until the fitting 42 for the core wire 22 is inserted into the core wire connector 50 and against the fitting 44 for the transmission side core wire 23, thereby positively connecting the two core wires 22, 23 and placing them in a compression bias.

Once the core wires 22, 23 are seated together, the spring retainer 34 is released. This allows the spring 37 to partially relax. The engagement of the male and female retaining clips 68, 36 prevents the spring 37 from relaxing completely, though. This arrangement maintains a force exerted on the male housing 26 by the spring 37, providing an adjustment bias that pushes the male housing 26 into the female housing 28. In this state, the male housing 26, and with it the shifter side conduit 20, may be advanced or retracted to finely adjust the overall length of the cable assembly 10. Once the desired length has been achieved, the adjustment clip 62 is lowered into the locked position wherein the ridges 72 of the adjustment clip 62 engage with the ridged adjustment section 40 of the male housing 26 to firmly lock the male and female housings together, thereby forming a complete motion-transmitting cable assembly. The primary limitation on the amount of movement of the male housing 26 is the length of the ridged adjustment section 40. In order for the male and female housings to be firmly locked together, the adjustment clip 62 must be able to engage with the ridged adjustment section 40 when it is placed in the locked position. If the male housing 26 is retracted too far out of the female housing 28, the adjustment clip 62 will not engage the adjustment section 40 when lowered into the locked position.

While the above description utilized the context of a transmission shift control cable, it will be understood by those skilled in the art that components described herein may be used in any application using a conduit/core wire assembly.

Once connection and adjustment of the cable assembly 10 is completed, the two conduits 20, 21 are positively connected to one another via the male 26 and female 28 housings while the two core wires 22, 23 are positively connected to one another via the fittings 42, 44 and the core wire connector 50. The conducted conduits 20, 21 and the connected core wires 22, 23 remain free to move relative to one another. The connection and adjustment of the cable assembly 10 may be completed either before or after the transmission 12 and shifter 14 sides are connected to their respective mounting points.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. A two-piece motion-transmitting cable assembly, including:
   a first cable having a first core wire surrounded by a first conduit;
   a second cable having a second core wire surrounded by a second conduit;
   a core wire connector which joins said first and second core wires when said first and second core wires are brought together;
   a male housing connected to one end of the first conduit and having a ridged length adjustment section;
   a spring retainer slideably interconnected with the exterior of the male housing and having a female retaining clip at a first end;
   a female housing connected to one end of the second conduit at one end and having a male retaining clip, which engages with the female retaining clip when the male and female housings are mated;
   an adjustment clip removably connected with the female housing, which engages with the ridged length adjustment section to lock the male housing in a position relative to the female housing;
   a first fitting connected to one end of the first core wire and a second fitting connected to one end of the second core wire, said core wire connector being located within the female housing and having first and second ends into which are inserted the first and second fittings, respectively; and
   a spring contained between the exterior of the male housing and the interior of the spring retainer and interacting with the spring retainer to bias the first conduit in a direction toward the second conduit, thereby placing said joined first and second core wires in a compression bias.

2. A two-piece motion-transmitting cable assembly, including:
   a first cable having a first core wire surrounded by a first conduit;
   a second cable having a second core wire surrounded by a second conduit;
   a core wire connector which joins said first and second core wires when said first and second core wires are brought together;
   a male housing connected to one end of the first conduit and having a ridged length adjustment section;
   a spring retainer slideably interconnected with the exterior of the male housing and having a female retaining clip at a first end, wherein the spring retainer defines at least one linear, slotted opening permitting expansion of said spring retainer;
   a female housing connected to one end of the second conduit at one end and having a male retaining clip, which engages with the female retaining clip when the male and female housings are mated;
   an adjustment clip removably connected with the female housing, which engages with the ridged length adjustment section to lock the male housing in a position relative to the female housing; and
   a spring contained between the exterior of the male housing and the interior of the spring retainer and interacting with the spring retainer to bias the first conduit in a direction toward the second conduit, thereby placing said joined first and second core wires in a compression bias.

\* \* \* \* \*